United States Patent [19]

Belz et al.

[11] Patent Number: 5,359,608
[45] Date of Patent: Oct. 25, 1994

[54] APPARATUS FOR ACTIVATION AND DEACTIVATION OF INSTRUCTION TRACING THROUGH USE OF CONDITIONAL TRACE FIELD IN BRANCH INSTRUCTIONS

[75] Inventors: John Belz, San Jose, Calif.; Linda Newell, Genoa, Nev.

[73] Assignee: Amdahl Corporation, Sunnyvale, Calif.

[21] Appl. No.: 980,979

[22] Filed: Nov. 24, 1992

[51] Int. Cl.$^5$ ............... G06F 11/30; G06F 11/34
[52] U.S. Cl. ..................... 371/16.5; 371/19; 364/DIG. 1; 364/267; 364/267.6
[58] Field of Search ............. 395/375, 575; 371/19, 371/16.5, 29.1; 364/DIG. 1 MS File, DIG. 2 MS File

[56] References Cited

U.S. PATENT DOCUMENTS

| | | | |
|---|---|---|---|
| 3,673,573 | 6/1972 | Smith | 395/375 |
| 4,423,508 | 12/1983 | Shiozaki et al. | 371/19 |
| 4,429,368 | 1/1984 | Kurii | 395/575 |
| 4,453,093 | 6/1984 | Boudreau | 371/19 |
| 4,598,364 | 7/1986 | Gum et al. | 371/19 |
| 5,058,114 | 10/1991 | Kuboki et al. | 371/19 |

*Primary Examiner*—Robert B. Harrell
*Assistant Examiner*—Richard Lee Ellis
*Attorney, Agent, or Firm*—Fliesler, Dubb, Meyer & Lovejoy

[57] ABSTRACT

A conditional trace system in a computer system for controlling the enablement of a trace operation in the computer system, the computer system including a set of instructions for operating said computer, the set of instructions including branch instructions, the branch instruction generating a jump signal whenever the branch instruction performs a branch operation, the conditional trace system comprising a conditional trace field in each branch instruction where the conditional trace field has either a first or second value and a first means responsive to the value of said conditional trace field and the jump signal for selectively enabling and disenabling the trace operation within the computer system.

5 Claims, 1 Drawing Sheet

APPARATUS FOR ACTIVATION AND DEACTIVATION OF INSTRUCTION TRACING THROUGH USE OF CONDITIONAL TRACE FIELD IN BRANCH INSTRUCTIONS

BACKGROUND OF THE INVENTION

1. Field of the Invention

The present invention relates to the tracing of microwords being processed in a computer system.

2. Description of the Related Art

In many computer systems the feature of tracing is used for storing the operations of sequential microwords as they are processed by the computer system to allow error analysis of errors that occur during processing. To this end, the addresses of all processed microwords are sequentially stored in a random access memory which is generally designed to store a plurality of addresses. The address of the microword being processed is stored over the oldest address in the random access memory after the random access memory has been initially filled.

Many programs use timeout loops and software delays. These timeout loops or software delays are a series of micro-instructions which either provide a pause in the operation of the program as indicated by a delay loop, or a period of time for an event to be sensed by the program as provided by a timeout loop. When a timeout loop or delay loop is used the number of resulting addresses stored can be very large and can fill, or substantially fill, the random access memory. This is an undesirable feature of the timeout or delay loop because if an error occurs after the timeout loop or delay, the past history of the operation of the computer might be lost and therefore hamper the debugging of the error state of the system.

SUMMARY OF THE INVENTION

Accordingly it is an object of the present invention to provide a conditional trace apparatus which will allow the disabling of the trace mode of operation during a timeout or delay loop routine within a program.

It is another object of the invention to provide a means for controlling when the trace mode is on or off during specific portions of a computer program.

The system includes the addition of a one bit conditional trace field to the BRANCH instruction of the instruction set being used by the computer. When a zero is contained within the conditional trace field the trace mode will be turned on, and when a one is stored in the conditional trace field the tracing will be turned off. A trace disable latch is set whenever a BRANCH instruction has a one in the conditional trace field and the branch or jump is taken by the BRANCH instruction. The trace disable latch will remain set until either a BRANCH instruction is processed where the conditional trace field is set to a zero and a jump or branch for that instruction is executed, or a BRANCH instruction is processed where the conditional trace field is set to a one and a jump or branch is not executed by the instruction. The output of the trace disable latch controls the TRACE RAMWRITE ENABLE signal to the RAM storage and disables writing of addresses into the trace RAM when the trace disabled latch is set.

The advantage of the invention is to allow timeout loops and delay loops to be incorporated within a program and to provide a means by which the trace mode is disabled during the operation of such programming loops.

BRIEF DESCRIPTION OF THE DRAWINGS

The invention will be described with respect to particular embodiments thereof and reference will be made to the drawings, in which.

DETAILED DESCRIPTION OF THE PREFERRED EMBODIMENTS

Figure 1:
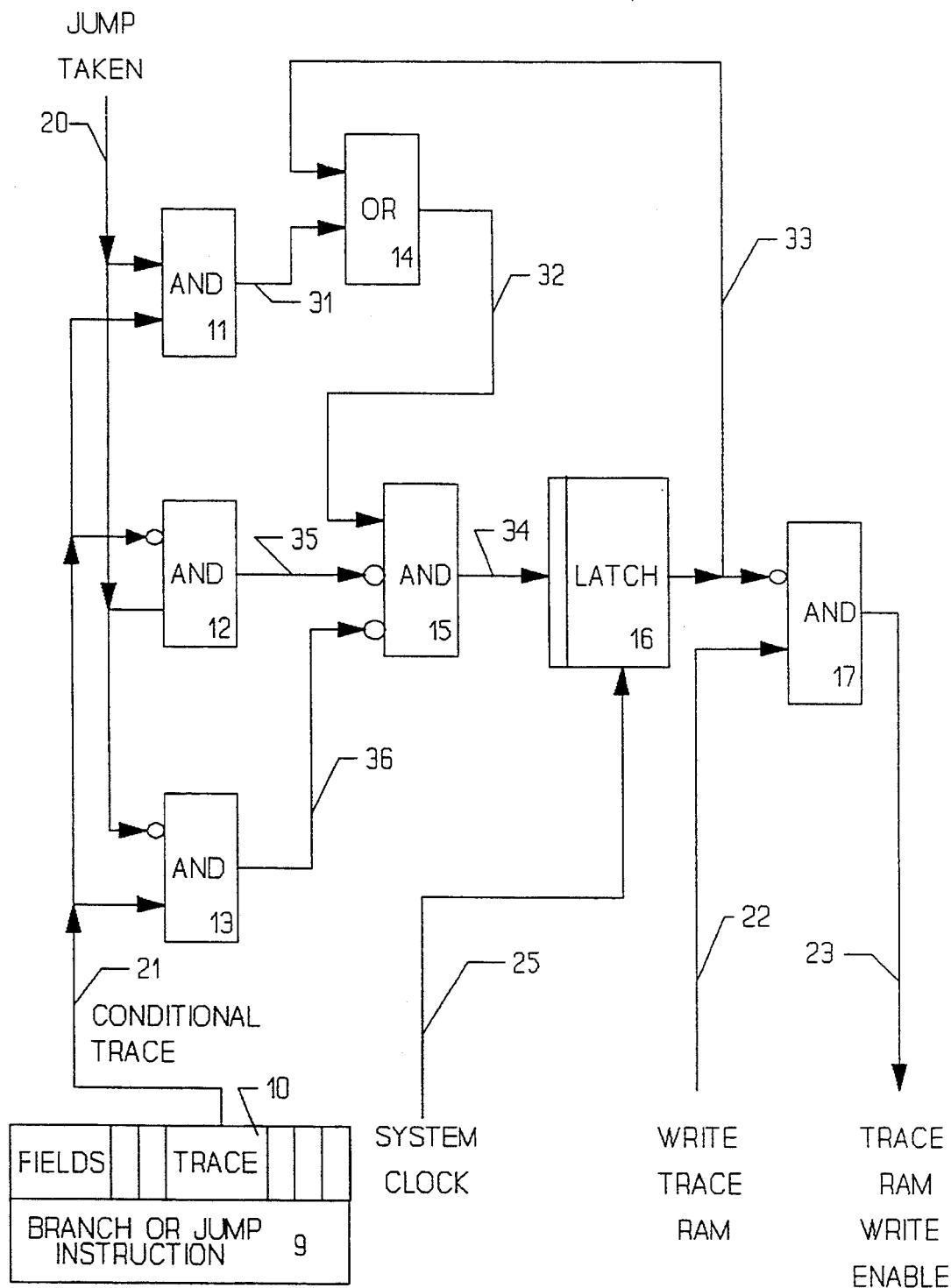
FIG. 1 is a logic diagram for controlling the trace mode of operation within a computer.

FIG. 1 shows the logic necessary to implement the conditional trace mode of operation of the trace feature within a computer system. A one bit conditional trace field 10 is added to the BRANCH or JUMP instructions 9 within the instruction set of the computer system. When the conditional trace field 10 is set to a one the trace mode of operation will be turned off if other criteria are met. Where the conditional trace field 10 is set to a zero the trace mode of operation will operate in its normal manner. The contents of the conditional trace field 10 is provided on line 21 to ANDs 11, 12 and 13.

A BRANCH instruction 9 provides a choice of two paths in the program according to the status of some element being tested by the BRANCH instruction 9. If the status is met, then the instruction 9 directs the program to jump or branch to a new address for further processing. If the condition is not met, then the branch or jump will not be performed and the next step in the program will be executed. During a BRANCH instruction 9, if the branch or jump is taken, a signal is generated on line 20 which is connected as inputs to ANDs 11, 12 and 13.

AND 11 tests for the condition of a one in a conditional trace field 10 of a BRANCH instruction 9 and a resulting branch or jump being taken. AND 12 tests for the condition of a zero being contained in the conditional trace field 10 of a branch instruction 9 and a resulting branch or jump being taken. AND 13 tests for the condition of a one in the conditional trace field 10 of the branch instruction 9 and no resulting jump or branch being taken. The output of AND 11 is connected via line 31 to OR 14. The output of OR 14 is connected via line 32 to one input of AND 15. The output of AND 12 is connected via line 35 to a negative input of AND 15 and the output of AND 13 is connected via line 36 to a negative input of AND 15. AND 15 will be conditioned when AND 11 is conditioned and ANDs 12 and 13 are deconditioned. The output of AND 15 is connected by line 34 to disable trace latch 16. A system clock signal on line 25 will read in the contents of AND 15 into latch 16. The output of latch 16 is connected by line 33 to a negative input of AND 17 and to an input of OR 14. Once set latch 16 will remain set regardless of the output of AND 11 on line 31. AND 17 receives a WRITE TRACE RAM signal on line 22 which appears as a TRACE RAM WRITE ENABLE signal on line 23 when latch 16 is set to a zero.

Latch 16 controls the TRACE RAM WRITE ENABLE signal on line 23 thereby effectively controlling the writing of instructions into the RAM memory.

Once set latch 16 can only be reset by either AND 12 or AND 13 becoming conditioned.

AND 12 will become conditioned when a BRANCH instruction 9 is encountered that has a zero in the conditional trace field 10 of that BRANCH instruction and the branch or jump option of that instruction 9 is taken. AND circuit 13 will be conditioned when a BRANCH instruction 9 is executed that has the conditioned trace field 10 equal to a one and the jump or branch option is not taken. When AND 15 is deconditioned the next system clock appearing on line 25 will read a zero into latch 16. Latch 16, being set to a zero, will enable AND circuit 17 thereby allowing the trace mode to operate in its normal fashion.

The operation of the system will be explained with reference to an example of a sequence of programming steps. Assume that the program performs the following programming steps:

| 0 | | DELAY←256; |
|---|---|---|
| 1 | DELAY_LOOP | DELAY←DELAY-1; |
| 2 | | IF (MAINSTORE_DONE) GOTO HANDLE_MS_OP; |
| 3 | | IF (DELAY >0) COND_GOTO DELAY_LOOP; |
| 4 | | SET_EHL (MS_TIMEOUT). |

The above program provides a program loop for timing out a time period for the program to detect the condition that mainstore is done. When that condition, i.e. mainstore is done, is detected by the program, the program will branch to MS OP and proceed with that mainstore operation. The timeout period is equal to 768 machine cycles since each of the 256 loops will use 3 machine cycles. If the condition of step 2 is not met and the delay is equal to zero, then step 3 will move to step 4 thereby setting an error latch to indicate an error condition.

Steps 2 and 3 are BRANCH instructions 9 where the conditioned trace field 10 is set to a one and is indicated by the presence of the language "COND" within the instruction.

When BRANCH instruction 9 of step 2 is first processed AND circuit 11 will not be conditioned because the conditional trace field 10 of that BRANCH instruction 9 will have been set to a zero. Therefore AND 17 will be enabled and that BRANCH instruction 9 will be traced. If the condition being tested by the BRANCH instruction 9 of step 2 is not met then step 3 will be executed. Step 3 is a BRANCH instruction 9 which has a one in the conditional trace field 10. The condition being tested by step 3 is whether the delay as shown in step 1 is greater than zero. When the delay is greater than zero a jump is taken, resulting in AND 11 being conditioned. It is readily apparent that ANDs 12 and 13 will be deconditioned at this time and, therefore, AND 15 will be conditioned which will cause trace disable latch 16 to be set to a one. When the trace disable latch 16 is set to a one AND 17 will be deconditioned, blocking the TRACE RAM WRITE ENABLE signal from reaching the RAM storage unit. The output of trace disable latch 16 will latch up trace disable latch 16 which will then remain set regardless of the status of AND 11.

Once in this condition steps 3, 1, 2 will be performed in that sequence until one of two events occur. The first event is if the BRANCH instruction 9 of step 2 is processed such that the jump or branch is taken, thus AND 12 will be conditioned thereby deconditioning AND 15 resulting in latch 16 being set to a zero. AND 17 will thereby be conditioned and the TRACE RAM WRITE ENABLE signal will again be provided to the RAM storage.

The second condition occurs when the delay of step 1 is equal to a zero. In this condition the BRANCH instruction 9 would not branch but rather proceed to step 4. As such, the conditions of AND 13 would be met which would again cause AND 15 to be disabled resulting in latch 16 being set to a zero. AND 17 will thereby be conditioned and the TRACE RAM WRITE ENABLE signal will again be provided to the RAM storage.

While the invention has been particularly shown and described with reference to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following claims.

What is claimed is:

1. A conditional trace apparatus in a computer system for controlling the activation of a trace operation in said computer system, said computer system including a set of instructions for operating said computer, said set of instructions including branch instructions, said branch instructions generating a jump signal whenever said branch instructions perform a branch operation, said conditional trace apparatus comprising:

a conditional trace field in each said branch instruction, said conditional trace field having either a first or second value; and first means responsive to said value of said conditional trace field and said jump signal for selectively activating and deactivating said trace operation of said computer system, said first means comprising:

second means for generating a set signal whenever there is coincidence between said first value of said conditional trace field and said jump signal;

third means for generating a first reset signal whenever there is coincidence between said first value of said conditional trace field and the absence of said jump signal; and fourth means for generating a second reset signal whenever there is coincidence between said second value of said conditional trace field and said jump instruction.

2. The conditional trace apparatus of claim 1 wherein said first means further comprises:

fifth means for generating a trace deactivation signal in response to said set signal generated by said second means and for generating a trace activation signal in response to said first reset signal generated by said third means or said second reset signal generated by said fourth means.

3. The conditional trace apparatus of claim 2 wherein said first means further comprises:

sixth means connected to said fifth means for maintaining said fifth means to generate said trace activation signal until reset by said first or second reset signal for generating said activation signal.

4. The conditional trace apparatus of claim 3 wherein said first means further comprises:

seventh means connected to said fifth means for activating and deactivating said trace function of said computer system in response to said trace activation signal and said trace deactivation signal generated by said fifth means.

5. The conditional trace apparatus of claim 2 wherein said first means further comprises:

seventh means connected to said fifth means for activating and deactivating said trace function of said computer system in response to said trace activation signal and said trace deactivation signal generated by said fifth means.

* * * * *

UNITED STATES PATENT AND TRADEMARK OFFICE
CERTIFICATE OF CORRECTION

PATENT NO. : 5,359,608
DATED : October 25, 1994
INVENTOR(S) : John Belz et al.

It is certified that error appears in the above-indentified patent and that said Letters Patent is hereby corrected as shown below:

Column 4, line 54, "claim 3" should be --claim 2--;

Column 4, line 61, "claim 2" should be --claim 3--.

Signed and Sealed this

Seventh Day of May, 1996

Attest:

BRUCE LEHMAN

*Attesting Officer*     *Commissioner of Patents and Trademarks*